A. P. ANDERSON.
STARCH PELLETS, PEBBLES, OR NODULES, AND PROCESS OF MAKING SAME.
APPLICATION FILED AUG. 31, 1906.
1,035,831.
Patented Aug. 20, 1912.
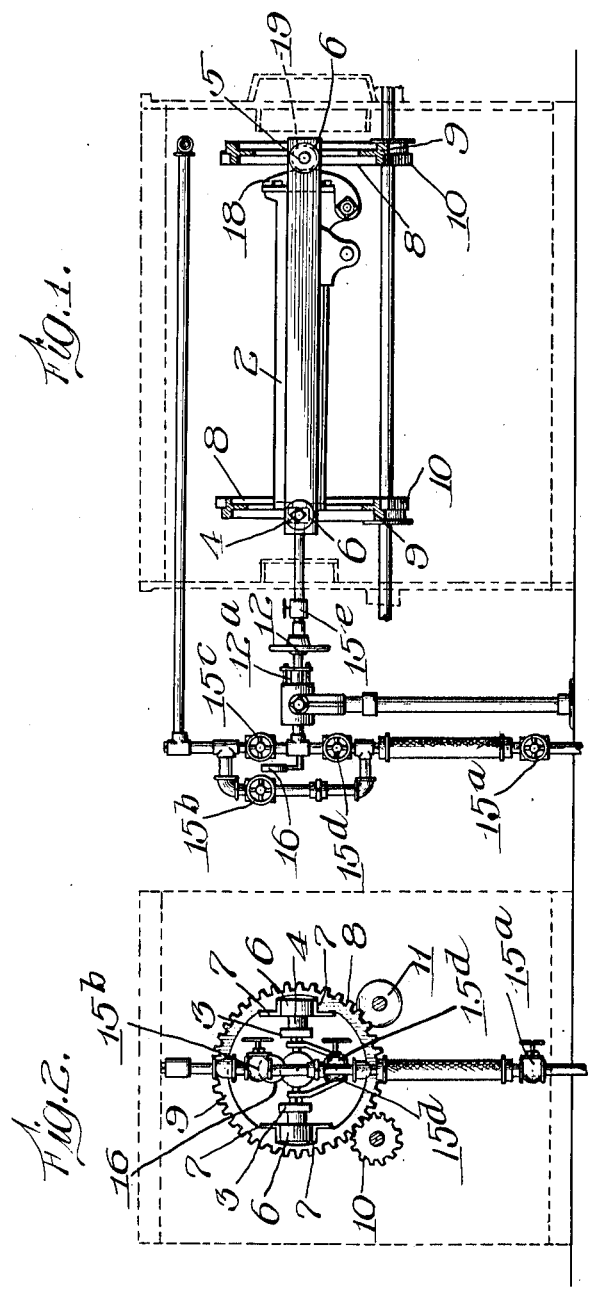
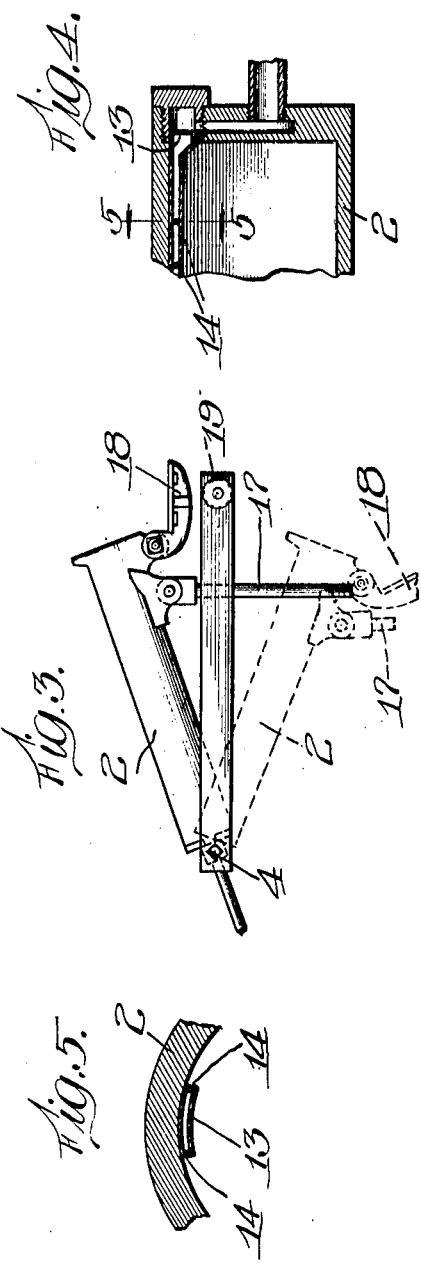

UNITED STATES PATENT OFFICE.

ALEXANDER P. ANDERSON, OF CHICAGO, ILLINOIS.

STARCH PELLETS, PEBBLES, OR NODULES AND PROCESS OF MAKING SAME.

1,035,831.  Specification of Letters Patent.  Patented Aug. 20, 1912.

Application filed August 31, 1906. Serial No. 332,807.

*To all whom it may concern:*

Be it known that I, ALEXANDER P. ANDERSON, a citizen of the United States, residing at Chicago, in the county of Cook and State of Illinois, have invented new and useful Improvements in Starch Pellets, Pebbles, or Nodules and Processes of Making Same, of which the following is a full, clear, concise, and exact description, reference being had to the accompanying drawing, forming a part of this specification.

My invention relates to a process of treating starch, and to a new product obtained from starch.

This application relates to a species of the generic invention set forth in my application filed contemporaneously herewith, Serial No. 332,804.

It is the object of my invention to provide a rapid, economical and efficient process of treating starch in the powdered condition to produce a new and useful product which may be used for food and other purposes; also, to produce a product itself which may be formed by the process referred to and having new and useful properties hereinafter described.

The above process may be carried out and the new product produced by means of the apparatus shown in the accompanying drawing, or by the apparatus shown and described in my co-pending application, filed August 3, 1906, Serial No. 329,030.

In these drawings, Figure 1 is a side view of the piping together with a longitudinal sectional elevation of the drum-support in the oven, the latter being indicated in dotted lines; Fig. 2 is a rear end view of the arrangement shown in Fig. 1; Fig. 3 shows the drum in charging and discharging positions, the latter position being indicated in dotted lines; Fig. 4 is a sectional view of the rear end of the drum; and, Fig. 5 is a section of the drum on the line 5—5 of Fig. 4.

The raw material to be treated is put into a drum 2, mounted upon a suitable car capable of being rolled about and brought to the various parts of the apparatus for handling. The car consists of two side members 3, 3, having a trunnion 4 extending therebetween at the rear end; a shaft or axle 5 connects the forward ends of said members. Small wheels or rollers 6 are mounted outside of the members 3, upon the projecting ends of trunnion 4 and shaft 5. The cars run on a track 7 within the oven, consisting of four rails fastened to the inside of the cage 8. At each end of the oven is a ring 9 having teeth outside forming a gear, which meshes with another gear 10 adapted to rotate the cage. The gears 10 and rollers 11 support the cage and inclosed drum, in addition to causing rotation thereof by any suitable power applied to one of their supporting shafts outside of the oven.

After the drum has been run into the oven, a steam-connection is made at 12, thus admitting steam to the flattened pipe 13 inside of the drum. The steam escapes into the drum through numerous holes 14 in the pipe, said holes becoming more frequent in proportion to the drop in pressure as the steam advances.

By means of the gears 9 and 10 the cage containing the drum is rotated slowly during the heating. Rotation is permitted by the stuffing box $12^a$ which at the same time maintains the steam-connection. The arrangement of the piping shown is as follows: $15^a$, $15^b$, $15^c$, $15^d$ and $15^e$ are valves; 16 is a pressure gage. By opening valves $15^b$, $15^a$, and closing valves $15^d$ and $15^c$, the steam is by-passed around the drum. By closing the valve $15^b$ and opening $15^c$, the pressure in the drum may be brought to any desired point as shown by gage 16. To reduce the pressure in the drum, valve $15^c$ may be closed and $15^d$ opened, whereby the pressure escapes into the atmosphere. Thus, by proper valve-manipulation, the conditions of pressure and temperature in the drum may be regulated and controlled absolutely within the desired limits. It will be understood that the oven is heated by any suitable or desired means, as, for example, by gas.

The lid 18 of the drum is clamped tightly closed, a suitable soft-metal gasket being provided to cause an air-tight connection, when the drum is in the horizontal position in its frame. In order that the heating may not unseal the lid, I prefer to make the drum of bronze or some material having a higher coefficient of expansion than the side members of the frame.

To remove the drum from the oven after the heating, valve $15^e$ is closed, the drum is disconnected at 12, and is run out of the oven to a raising and lowering mechanism suitably connected with the drum through the arm 17. By means of this mechanism the drum is lowered about the shaft 4 as a pivot, as indicated in dotted lines in Fig. 3.

The lid, 18, previously held shut by the roller 19, suddenly flies open from internal pressure, if pressure there be, and the contents are discharged assisted by gravity. In charging, the drum is raised by the same arm or screw 17 until it tilts upwardly, when the material to be treated may be fed into the drum.

By means of the apparatus just described, which is preferred for commercial purposes, it is convenient and practicable to subject the material in the drum or cylinder to any degree of heat or pressure, as well as to the desired agitation or tumbling action.

In the preferred manner of carrying out the process, I take starch which contains about 35 to 45% of moisture. When air-dry starch is used, the moisture percentage of which is known, it is necessary to add water to it, so as to bring its moisture up to that needed. Such water may be added by any convenient method, as by spraying, while the starch is being stirred. It is apparent that when starch contains from 35 to 45% of moisture, it contains no lumps like those present in either pearl starch or in the ordinary lump starches, it being well known that lump starch contains a smaller percentage of moisture, being about air-dry. Starch, therefore, containing about 35 to 45% of moisture contains no lumps since the water has broken down the lumps that were present in the starch before the water was added, provided the water was fully distributed. Freshly made starch which has been freed from a sufficient amount of its water to bring its moisture percentage down to about 35 to 45% may be used instead of adding the water to air-dry starch, as mentioned.

Enough of the starch, comminuted or in a reduced state of subdivision, is now put into the rotatable drum to fill the same about one-half to three-fourths. The drum is then closed air-tight, and the treatment begun by heating the drum while it is kept rotating preferably in a horizontal position. The drum is heated by any suitable means, as by placing it inside of the oven, or it may have a steam-jacket around it, in which case sufficient heat can be obtained by admitting steam at a sufficient temperature to this jacket. The temperature to which the drum is heated is about 150° to 200° C.

On account of the rotation of the drum, the starch during the treatment is continually tumbling upon itself, and its temperature kept increasing. When this temperature reaches the gelatinization-temperature of the starch, say about 70° to 80° C., the starch granules become sticky, and a few coalesce together, and form a starting point or nucleus around which other starch granules become attached as soon as they are sufficiently sticky by partial gelatinization. It is very likely that all of the starch granules do not become sticky at the same time, since on account of their varying sizes they are not all of them at the same temperature at the same time, especially when the starch under treatment first reaches its gelatinization-temperature of about 70° to 80° C.

I have found that almost an innumerable number of these nuclei or centers form throughout the starchy mass under treatment, and apparently at substantially the same time, so that they all begin their growth by the accretion of the still remaining loose starch, thereby increasing in size in their tumbling or rolling about, at about the same rate. So that when they have gathered up all of the loose starch, they are about the same size, usually varying from the size of an ordinary pin-head to that of a grain of wheat. In either form, the lumps or balls are nodular, pellet or pebble-like, due to their method of growth by the accretion of particles on their surfaces while tumbling or rolling.

The formation of the starch into pebble lumps, as explained, occurs at a comparatively low temperature of the starch, and is completed by the time this temperature reaches 100° C. or slightly higher. At this temperature, or soon after, the pressure gage on the drum begins to show pressure, due to the formation into steam of a part of the moisture in the starch. This steam increases in temperature and quantity with the increasing temperature of the drum, and the contained starch is now in the form of lumps or pebbles. The steam-atmosphere thus formed inside of the drum and surrounding the tumbling lumps is substantially saturated steam, which is at a greater temperature than the starch lumps. Hence, condensation of the steam on the lumps takes places, making their surfaces wet with free water. It follows also that the whole lump of starch containing, as it does, about 35 to 45% of moisture cannot hold all of this moisture within itself when at this temperature, so that some of the moisture which is left after that which has formed into steam must of necessity form on the surface of the lumps as free water or sweat.

It has been found that the surfaces of the lumps as soon as they have formed and gathered up all of the loose starch, as above explained, are smooth and considerably hardened. So that as soon as they become surrounded with the steam atmosphere and condensation of steam takes place on their surfaces, they are sufficiently hard and their surfaces sufficiently gelatinized, as well as so wet with free water or sweat, that they are what may be termed slippery, and for this reason do not stick together, but continue tumbling separately and thereby polish each other. It is apparent that the moisture thus formed and present on the surfaces of the lumps during the treatment causes the greater gelatinization of the starch on the periphery of the lump, as well as gives it a continuous sealed and polished surface. Also, on account of the comparatively large percentage of moisture present in the starch, gelatinization to the extent of actual fusion of the starch granules takes place throughout the whole lump and therefore causes a hard, horny and insoluble starch-lump. The treatment is continued until a pressure of about 10 to 25 pounds per square inch has developed inside of the drum, the total time required for treatment up to this pressure being about one and one-half to two hours. The blow-off valve of the drum is now opened, partially at first, and then fully, and the blowing off continued until the pressure falls to zero. The drum is then opened, and the starch lumps taken out. As they come out of the drum they still contain about 25 to 30% of moisture. They are therefore spread out to dry in the sun or kiln dried by ordinary methods, until the lumps are in air-dry condition.

I have found that although it is preferable to use some pressure in making the product, as above described it may be made by leaving the blow-off valve of the drum open so as to allow the steam formed by the heating of the starch to escape slowly through it, and by subjecting the drum to a higher heat than that mentioned above, that is, to about 250° C. In following this method, the product can be made in about one hour and thirty minutes instead of two hours, as stated above. The other steps may remain the same, except that the final blow-off is of course unnecessary.

The product thus produced consists of dry pebble-like grains in which all of the starch has been uniformly gelatinized and to such an extent that the whole grain has been converted into a hard, horny pebbled lump starch having an unbroken glazed and polished surface. The product has a homogeneous structure throughout, but due to its growth as made by the above process by the accretion of starch on its surface when tumbling or rolling, concentric layers more or less distinct, especially when heated, can be seen. That is, its starch has been gelatinized to the same extent and carried so far that a more or less complete fusion or coalescence of the granules has taken place; the lumps therefore do not break down or dissolve in either cold or boiling water. When placed in water, they absorb it slowly, and when boiled they swell considerably, becoming soft, semi-transparent and jelly-like, still, however, retaining their shape, and being soft enough to be easily crushed by the fingers. In this jelly-like condition they may be used as a food by sweetening, or by being made into puddings, etc. Instead of using water the lumps may be boiled with milk. A still further use of the product is that it can be swelled or puffed in a substantially air-dry condition, that is, when it contains about 15 to 25% of moisture, by subjecting it to the treatment for swelling or puffing described in the preferred process of my co-pending application Serial No. 332,805 filed August 31, 1906, and finally pulverizing and preferably bolting the swelled product thus obtained. A new starch powder thus results which is substantially the same as that described in said application.

Inasmuch as it is not necessary to have the drum air-tight during the treatment of the starch, as hereinbefore fully explained, I would have it understood that by the term "closed receptacle", appearing in the appended claims, I mean a receptacle which may or may not be closed air-tight, according as it is desired to carry out the process with or without extreme pressure within the receptacle,—all as previously set forth.

Having thus described my invention, what I claim as new and desire to secure by Letters Patent, is:

1. The process disclosed, which consists in heating comminuted starch containing about 35 to 45 per cent. moisture in a closed receptacle to a sufficient temperature to start gelatinization, whereby adhesive nuclei or centers are formed, meanwhile subjecting the material to a tumbling action, and then continuing the heating and tumbling until the mass has been substantially completely gelatinized and substantially all of the loose material has been gathered up by the nuclei or centers into pellet-like lumps.

2. The process disclosed, which consists in heating and tumbling comminuted starch containing about 35 to 45 per cent. moisture in a closed receptacle to a sufficient temperature to start gelatinization, whereby adhesive nuclei or centers are formed which, due to the tumbling action, gather up the loose material into pellet-like lumps, the heat being continued to the degree necessary to effect uniform gelatinization throughout the starch, and then drying the product to a substantially air-dry condition.

3. The process disclosed, which consists in heating and tumbling comminuted starch containing about 35 to 45 per cent. moisture in a closed receptacle and to a temperature necessary to bring about gelatinization of the starch-granules, whereby the same form adhesive nuclei or centers which, due to the tumbling action, gather up the loose material into pellet-like lumps, the heating being continued and raised to a degree necessary to practically completely gelatinize the starch, and then drying the product to a substantially air-dry condition.

4. The process disclosed, which consists in tumbling comminuted starch containing about 35 to 45 per cent. moisture in a closed receptacle and heating the same to a temperature sufficient to start gelatinization thereof, whereby adhesive nuclei or centers are formed, then continuing the heating, meanwhile tumbling the material, until a pressure of about 10 to 25 pounds per square inch has developed within the receptacle to practically completely gelatinize the starch, whereby substantially all of the loose material is gathered up by the nuclei into gelatinized pellet-like lumps, and then slowly reducing the pressure.

5. The process disclosed, which consists in heating in a closed receptacle comminuted starch containing about 35 to 45 per cent. moisture, while subjecting the same to a tumbling action, to a temperature sufficient to start gelatinization of the starch, whereby sticky nuclei or centers are formed, then continuing the heating and tumbling until a pressure of about 10 to 25 pounds per square inch has developed within the receptacle to completely gelatinize the starch and whereby, due to the tumbling action, substantially all of the loose material is gathered up by the nuclei into gelatinized pellet-like lumps, then slowly reducing the pressure, and then drying the product to a substantially air-dry condition.

6. As a new article of manufacture, a starch-product consisting of uniformly gelatinized pellet-like lumps, hard and horny throughout and having unbroken glazed or polished surfaces.

7. As a new article of manufacture, a starch-product consisting of hard and horny pellet-like lumps in which the starch is uniformly gelatinized throughout the lumps.

8. As an article of manufacture, a starch-product made from ordinary starch consisting of uniformly gelatinized pellet-like lumps which are hard and horny throughout and which, when placed in water, absorb it slowly, at the same time swelling and becoming soft and translucent, while retaining their original shapes.

In witness whereof, I have hereunto subscribed my name in the presence of two witnesses.

ALEXANDER P. ANDERSON.

Witnesses:
J. JAY SMITH,
JAMES RIDEOUT.